Patented Aug. 20, 1940

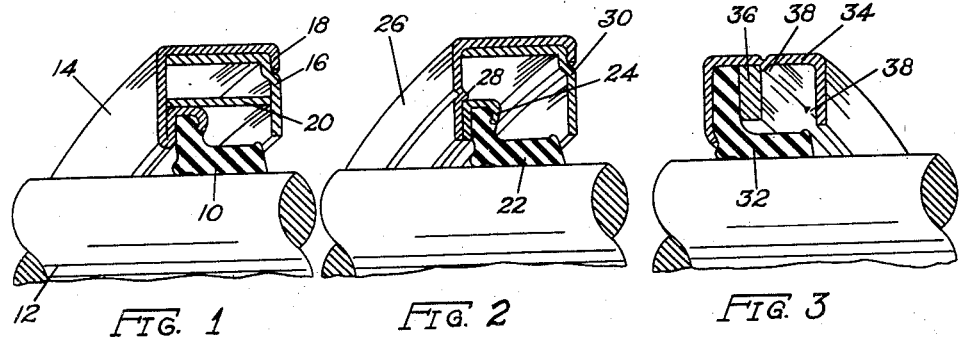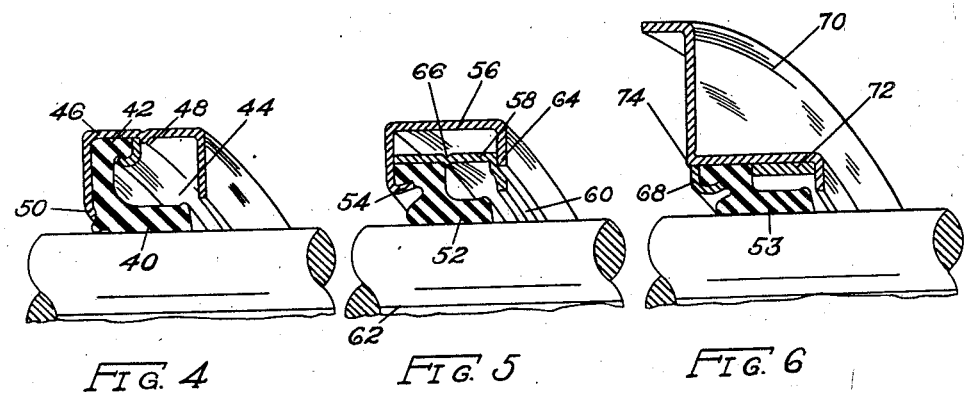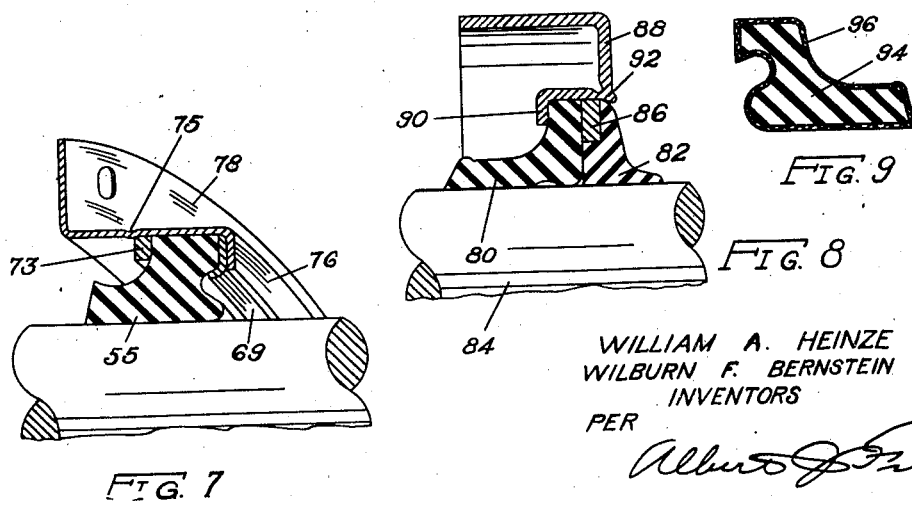

2,212,291

UNITED STATES PATENT OFFICE

2,212,291

FLUID SEAL WITH GRIPPED FABRIC FACED PACKING

William A. Heinze, Chicago, and Wilburn F. Bernstein, Brookfield, Ill., assignors to Victor Manufacturing and Gasket Company, Chicago, Ill., a corporation of Illinois Original application July 29, 1936, Serial No. 93,197. Divided and this application December 12, 1938, Serial No. 245,267

1 Claim. (Cl. 288—3)

This invention relates to an improved fluid seal with gripped packing, and has, for one of its principal objects, the provision of a sealing means, particularly those adapted for use in automobiles or the like which shall embody both the novel form of diaphragm or packing element and also a novel supporting means for same by which the same can be fitted into or otherwise mounted on a housing which usually surrounds the rotating shaft to be sealed.

This application constitutes a division of an application for patent on "Fluid seal with gripped packing" by these same inventors filed July 29, 1936, Serial No. 93,197.

One of the important objects of this invention is the provision, in connection with a novel form of annular diaphragm or packing element which is preferably composed of a composition including synthetic rubber, of metallic means for adequately supporting the same in a housing in oil-sealing relationship therewith.

Another object of the invention is to provide a special type of metallic core for an oil-sealing diaphragm which shall be composed of a minimum number of parts, and therefore simple and economical of construction, but which will, at the same time, afford a positive and adequate sealing action, and which can be used in connection with practically all types of installations.

Another and still further important object of the invention is to provide a double diaphragm sealing element which shall be effective as an oil seal on one side and as a water or dust seal on the other side.

Other and further important objects of the invention will be apparent from the disclosures in the accompanying drawing and following specification.

The invention, in a preferred form, is illustrated in the drawing and hereinafter more fully described.

In the drawing:

Figure 1 is a perspective view of one of the improved fluid seals of this invention, showing a novel means of gripping and sustaining the packing.

Figure 2 illustrates a modification of the device shown in Figure 1.

Figure 3 shows a more simplified form of the invention, and one which embodies a different type of diaphragm or sealing element.

Figure 4 shows another modification of the invention and illustrates a still further type of sealing element or diaphragm.

Figure 5 shows another fairly simple construction of packing and housing, illustrating a still further type of packing element.

Figure 6 shows the packing element of Figure 5 embodied into a different housing or supporting structure.

Figure 7 illustrates a construction somewhat the reverse of Figure 6 and also shows a further modified form of housing or support.

Figure 8 is a sectional view of one form of double diaphragm construction which is embodied in this particular invention.

Figure 9 is a sectional vew of a preferred form of diaphragm or packing, the same being ordinarily composed of synthetic rubber and other elements.

As shown in the drawing:

The reference numeral 10 indicates generally one form of diaphragm or packing element used in connection with the improved fluid seals of this invention, the same comprising an annular structure adapted to embrace a shaft 12 in sealing relationship therewith. The diaphragm is preferably L-shaped in cross-section, having one leg of the L adapted to contact the shaft and the other leg extending upwardly so as to afford a proper means for the gripping support of the retaining shell or housing which constitutes the remainder of the fluid seal.

In the embodiment shown in Figure 1, this retaining element or support comprises essentially an outer shell 14 of some suitable metal such as cold rolled sheet steel which is generally L-shaped in cross-section, but has one edge bent inwardly, thence outwardly, and again downwardly around the periphery of the packing so asto afford a tightly gripped contact therewith and which also comprises a protective armor for the periphery of the packing element 10.

Mounted in the shell 14 is a reinforcing shell 16 also L-shaped in cross-section, and a bead 18 of the shell 14 is turned over as shown to maintain the inner shell 16 in desired position.

In order to further reinforce the structure, a ring 20 is inserted in the shell 16 before the two shells are assembled, this ring 20 being of a size so as to slopingly contact the inturned armored portion of the shell 14 which has been previously fitted about the corresponding extension of the packing 10. In this way, a solid, substantial and oil-tight construction results.

In Figure 2, a slightly modified form of the invention is illustrated wherein the packing 22 is preliminarily gripped by a metallic armor 24 in the shape of a ring L-shaped in cross-section, having one edge bent inwardly to grip the packing, and this ring is then fitted into a retaining shell or housing 26 as shown, the housing having a bead or the like 28 struck inwardly therefrom to securely grip the armored ring 24. The shell 26 is further reinforced by means of an inner shell 30 similar in construction to the shell 16 of Figure 1. In this manner, a very durable and highly efficient oil-retaining structure is provided.

In Figure 3 is shown a slightly different type of diaphragm or packing element 32 having its peripheral outwardly extending portion of greater depth than those of the diaphragms 18 and 22, and this is held in a retaining shell 34 by means of a solid washer or the like 36 fitted in the shell and held in position therein by means of indentations or the like 38 struck inwardly from the shell at intervals around the periphery thereof. In this way, the outwardly extending arm of the packing element 32 is gripped between the bottom of the shell 34 and the washer 36 and obviously affords an oil-tight structure.

In Figure 4, the diaphragm 40 has a reversely turned portion 42 about which is mounted an armor in the form of a ring 44 L-shaped in cross-section, the armored diaphragm being then, in turn, mounted in a shell 46 U-shaped in cross-section as shown, the shell having indentations 48 which maintain the ring 44 and the diaphragm in desired position. The edge of one leg of the U-shaped shell 46 is inturned slightly as at 50 to afford a better grip and more perfect oil-sealing contact with the diaphragm.

In Figure 5 is shown a still further type of diaphragm 52 having a peripheral portion connected by a neck or the like to the main body or shaft packing portion, the peripheral portion being gripped between an inturned flange 54 of a shell 56 and the inner flat face of a ring 58 which is mounted in the shell and which preferably has a down-turned portion 60 extending towards the shaft 62 and affording a seat for an inturned portion or bead 64 of the shell 56. The ring 58 has indentations 66 contacting the adjacent periphery of the packing element 52 so as to more securely retain and fix the same in position in its metallic support or shell.

In Figure 6, a packing element 53 similar to that shown at 52 in Figure 5 is preliminarily armored by an L-shaped ring 68 which is then fitted into a shell or housing 70 against a washer 72, the shell being struck outwardly at different intervals about its periphery as shown at 74 to grippingly contact and retain the armor ring 68 and its appurtenances in desired position therein.

A reversed form of this construction is shown in Figure 7 wherein the diaphragm 55 is preliminarily gripped by an armor ring 69, the same being then inserted against a shoulder 76 of a shell or housing 78 and held in position by means of a washer 73 which is fitted in the inner periphery of the shell and held in position by means of indentations or the like 75.

In Figure 8 is shown a construction which is adapted to seal against both oil and water or other foreign substances, the same comprising a pair of diaphragms or packing elements 80 and 82 both being annular so as to fit about a shaft 84 and L-shaped in cross-section as shown.

The diaphragm 82 is of synthetic rubber or the like, and during the process of manufacture is molded into adhesive contact with a metal washer 86. The metal washer 86 may or may not have protuberances or the like by which a better contact between the rubber and metal is afforded during the molding operation. The two diaphragms are then placed with their opposed faces in contact as shown in a metallic shell or retaining structure 88 somewhat U-shaped in cross-section as shown, with one leg of the U bent inwardly as at 90 to provide a face against which a corresponding inner portion of the packing element 80 is positioned. The washer 86 and its attached diaphragm 82 are then placed in position in the shell, after which portions 92 of the shell are struck out as shown to securely clamp the washer 86 and its associated diaphragms in position in the housing.

In Figure 9, there is shown, in cross-section, one of the improved and preferred types of diaphragms of this invention such as that illustrated in Figures 5, 6 and 7, and as beforementioned, the same are preferably composed of synthetic rubber or some other composition which can be molded like rubber and which is impervious to oil or the material to be sealed, and the same preferably embodying a central core 94 of a plastic material, and an outer covering 96 of some fabric which is capable of deformation in a mold and is also capable of being impregnated during the molding operation with the plastic material 94, thereby forming a unitary structure.

It will be evident that herein is provided a fluid seal having a special type of packing and also having a special type of supporting means therefor, which grippingly maintains the packing in desired position in the support and also in oil-sealing relationship therewith and with the shaft to be sealed. It will be further seen that various modifications of the invention may be developed so as to meet any and all conditions encountered wherever these seals are used, particularly in the automotive industry, and even where such problems as double sealing against oil on one hand and water or dirt on the other hand are encountered.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A fluid seal, comprising an annular diaphragm L-shaped in cross-section, a metallic support therefor, said support including a cup-shaped shell, one edge of the shell being doubled upon itself inwardly and thence turned outwardly and downwardly to grippingly contact a corresponding portion of one arm of the diaphragm, a reinforcing shell in the first-named shell, contacting the same along the inner face of its periphery, and a further reinforcement in the inner shell, said further reinforcement comprising a ring fitted about the inturned portion of the outer shell and spaced from the inner face of the inner shell.

WILLIAM A. HEINZE.
WILBURN F. BERNSTEIN.